United States Patent [19]

Van der Wal

[11] 3,937,247
[45] Feb. 10, 1976

[54] VALVE FOR FLUIDS CONTAINING ABRASIVE PARTICLES

[76] Inventor: Jurjen Van der Wal, 1832 Newport Hills Drive, East, Newport Beach, Calif. 92660

[22] Filed: Jan. 23, 1974

[21] Appl. No.: 435,688

[52] U.S. Cl. ............... 137/375; 251/282; 251/325
[51] Int. Cl.² ........................................ F16K 39/02
[58] Field of Search ............ 137/375; 251/282, 325

[56] References Cited
UNITED STATES PATENTS

| | | | |
|---|---|---|---|
| 267,612 | 11/1882 | Steinmetz | 251/325 X |
| 359,948 | 3/1897 | Wilson | 137/625.3 X |
| 1,141,565 | 6/1915 | Lenning | 251/325 X |
| 1,938,943 | 12/1933 | Terry | 251/325 X |
| 2,029,837 | 2/1936 | Schmid | 251/325 X |
| 2,352,799 | 7/1944 | Newton | 137/375 |
| 3,324,879 | 6/1967 | Bucknell et al. | 251/325 X |
| 3,675,678 | 7/1972 | Lamping | 251/282 X |
| 3,680,832 | 8/1972 | Uliczky | 251/282 |

*Primary Examiner*—Henry T. Klinksik
*Attorney, Agent, or Firm*—Sellers and Brace

[57] ABSTRACT

A high pressure, high temperature, seatless cut-off valve particularly suitable for use with solid materials. The construction employs a sleeve valve reciprocable past aligned ports between concentric tubular housing members under conditions wherein the pressure conditions acting on the valve are fully neutralized at all times. Pressure neutralizing is achieved by passageway means interconnecting chambers embracing the end portions of the sleeve valve and encircling the valve in the area of its flow port and between sets of sealing rings to either axial side of this port. All surfaces contacted by the flowing fluid are preferably lined with protective laminate such as thick ceramic having a protective skin of tough abrasion resistant alloy.

19 Claims, 3 Drawing Figures

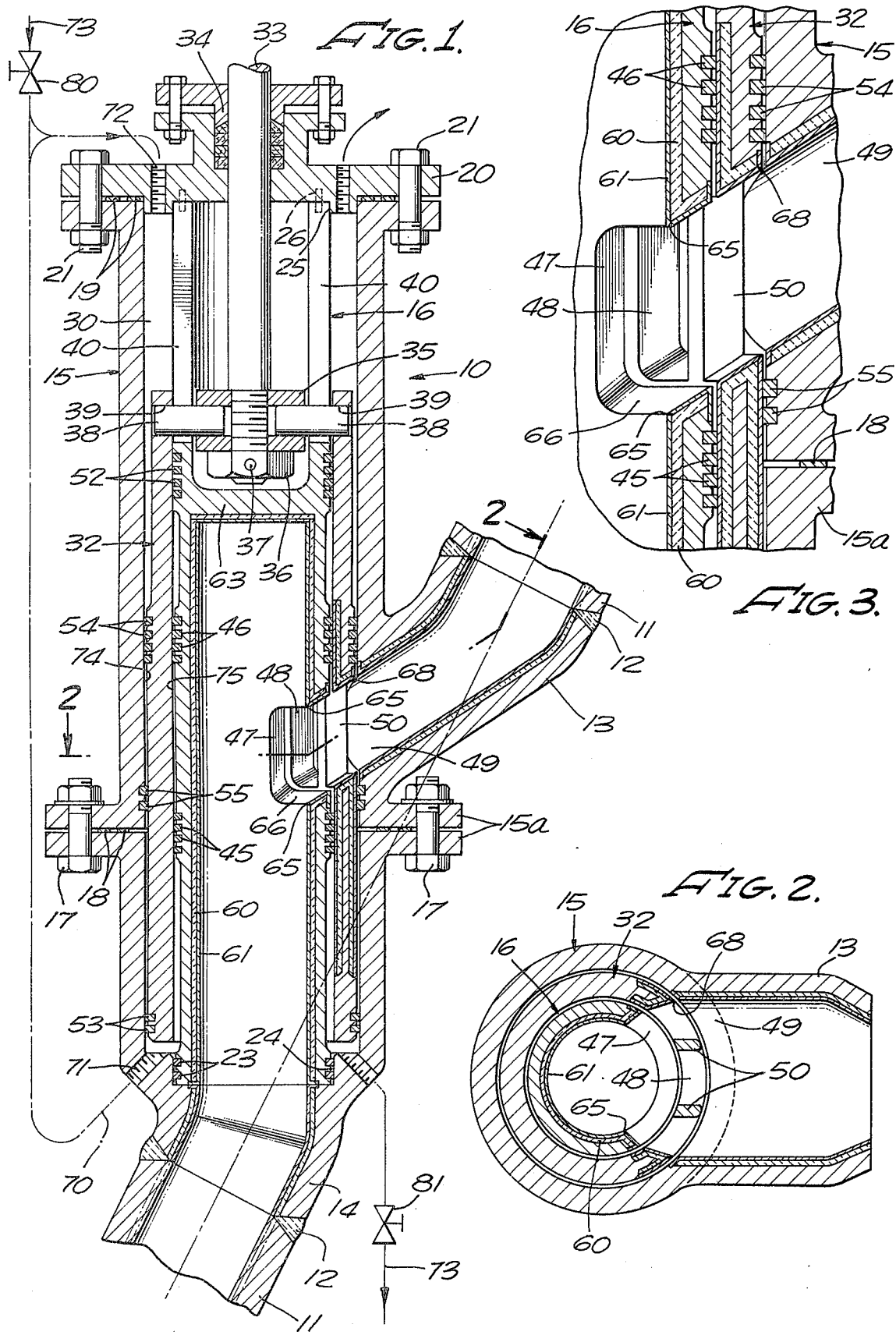

VALVE FOR FLUIDS CONTAINING ABRASIVE PARTICLES

This invention relates to valves, and more particularly to a specially designed valve capable of controlling large volume flow under extreme temperature and pressure conditions.

Current development programs involving the creation of new and improved energy sources, as from shale and low grade coal deposits, have need for shut-off valves handling massive flows of abrasive and granular materials under pressures in the neighborhood of 1,000°F. and 1,000 psi. All efforts to utilize known valve structures to meet these requirements have been largely unsatisfactory or unsuccessful. These attempts involve the use of many different types of valves including gate, ball and butterfly valve designs. The enormous loads imposed on the seats cause failure due to gouging, spalling and other causes. Also severe damage quickly results to seating areas due to impact by high velocity solid particles. Also very serious problems are presented as respects the provision of suitable packing and sealing expedients between relatively moving parts to leave unmentioned the problem of opening and closing the valve under the enormous prevailing pressure loads on the parts.

By the present invention there is provided an extremely rugged, simple and highly effective valve construction capable of meeting the aforementioned operating requirements. This valve can be made in major part from high strength material, such as cast steel, and includes inner and outer tubular main body members rigidly assembled in concentric relation and slidably supporting a pressure-neutralized sleeve valve therebetween. The midlength of this sleeve valve is provided with a flow port registerable with aligned companion flow ports through the inner and outer housing members. All three ports are preferably inclined acutely to the axis of the sleeve valve and toward an axial flow port at one end of the assembly. Several sets of sealing rings cooperate in providing fluid seals between the sleeve valve and the two housing members. The pressure equalizing expedients comprising important features of the new design include a pressure equalizing connection between the chambers embracing the opposite ends of the sleeve valve and axially outwardly of a set of sealing rings to either axial side of the sleeve valve flow port. The space surrounding the sleeve valve between these two sets of sealing rings communicates with one side of the flow port at all times thereby equalizing the pressure about the mid-section of the sleeve valve at all times. Accordingly, under normal operating conditions with the sleeve valve opened, the pressure is balanced on all sides of the sleeve valve. In the closed position of the sleeve valve, the pressure is likewise equalized because the entire exterior of the mid-length of the sleeve valve is subject to the same pressure. Accordingly, only the power necessary to overcome friction losses and inertia is involved when adjusting the valve either to or from its closed position. Interior surfaces of the valve contactable by high velocity hot fluids, particularly if including solid and abrasive particles, are preferably protected with a metal-clad lining of heat insulating material highly resistant to erosion and abrasion.

Accordingly, it is a primary object of this invention to provide a simply constructed and easily serviced rugged, fully pressure-neutralized cut-off valve.

Another object of the invention is the provision of a high pressure, high temperature cut-off valve which is movable between open and closed positions with no more force than that required to overcome friction and inertia losses.

Another object of the invention is the provision of a high capacity cut-off valve designed to operate under pressures in the area of 1,000 psi and temperatures of 1,000° to 1,700°F. and wherein the pressure differential across the valve when closed is effectively and substantially fully neutralized.

Another object of the invention is the provision of a high temperature, high pressure cut-off valve the interior surfaces of which are protected by a metal clad heat resistant lining.

Another object of the invention is the provision of a high pressure cut-off valve so designed that it can be inserted in a pipe line in lieu of a short section removed from the line.

These and other more specific objects will appear upon reading the following specification and claims and upon considering the connection therewith the attached drawing to which they relate.

Referring now to the drawing in which a preferred embodiment of the invention is illustrated:

FIG. 1 is a longitudinal cross-sectional view showing an illustrative embodiment of the valve in open position; and FIG. 2 is a cross-sectional view taken along the broken line 2—2 on FIG. 1; and FIG. 3 is a fragmentary view on an enlarged scale of the port area of the valve with the valve sleeve in open position.

Referring initially more particularly to FIG. 1, there is shown an exemplary embodiment of the invention, designated generally 10, installed in a pipe 11, 11 by cutting out a section of pipe between the welds 12, 12 and welding the inlet 13 and outlet 14 of the cut-off valve into place in lieu of the cut away section of pipe. In this connection it will be noted that the terminal portions of inlet 13 and outlet 14 are in axial alignment with one another and with conduit 11.

The principal parts of valve 10 are formed of suitable high strength material, such as thickwalled cast steel, capable of withstanding operating temperatures and pressures such as 1,000 psi and 1,700°F. The main body of the valve comprises a pair of concentric tubes 15, 16. Outer tube 15 is formed in two parts interconnected to facilitate assembly and servicing, these parts being separately joined by coupling means such as by flanges 15a and bolts 17. One or more malleable gasket rings 18 are positioned between the adjacent radial faces of flanges 15a to provide a high pressure seal between these flanges. Similar gasket rings 19 are employed to seal the closure end cap 20 to the upper end of outer tube 15, these parts being held clamped together by a closely spaced ring of bolts 21.

The lower end of inner tube 16 is equipped with metal sealing rings 23 having a close sealing fit with the sidewalls of a well 24 formed coaxially of the outlet tube 14. Likewise, the upper end of inner tube 16 seats in a shallow well 25 formed in the inner face of cover plate 20. One or more dowel pins 26 may extend across the abutting portions of tube 16 and the bottom of well 25 to hold the inner tube in a desired position and against the possibility of rotation from this position during opening and closing of the valve.

The annular chamber 30 between the concentric inner and outer tubes 15 and 16 provides an operating chamber for a sleeve valve 32 and adequate clearance between certain surfaces of this valve and adjacent surfaces of tubes 15 and 16. Valve 32 reciprocates in this chamber between the open position shown in FIG. 1 and a closed position wherein its upper end is located closely beneath the cover plate 20. Valve 32 is readily adjusted between these two positions by an operating rod 33 passing through a packing assembly 34 and having its lower end threaded to a block 35. This block is anchored against rotation by a lock nut 36 and a pin 37. A pair of trunnion pins 38 project from aligned openings in the opposite ends of block 35 and extend into openings 39 diametrically through the upper end of sleeve valve 32. Pins 38 are shiftable lengthwise of a pair of slots 40, 40 extending axially of the upper end of inner tube 16.

The inner and outer surfaces of sleeve valve 32 as well as the adjacent surfaces of tubes 15, 16 are accurately finished and cooperate with various sets of sealing rings to provide a fluid-tight seal at various locations and the details of which will now be described. In addition to the set of seals 23 at the lower end of inner tube 16, this tube is provided with two sets of seals 45, 46 located to either side of the flow port 47 through the sidewall of tube 16. Flow port 47, as here shown, is ovate-like in contour and is registerable with a flow port 48 through the sidewall of sleeve valve 32 and with a flow port 49 opening through the sidewall of the main valve housing into the tubular inlet 13. These several ovate flow ports preferably extend around a major portion of the periphery of the inner and outer tubes as well as sleeve valve 32, as is made clear by FIG. 2. In this connection it will be observed from FIG. 2 that inlet 13 has been broadened circumferentially of valve 10 in order to minimize valve travel without sacrificing flow area of the flow ports.

Port 48 through the sidewall of the sleeve valve preferably includes at least one or more axial ribs 50. The upstream edges of these ribs may be rounded but the downstream side lies flush with the interior sidewall of the sleeve valve and serves to prevent the upper set of sealing rings 46 from engaging the upper or lower edges of port 48 as the sleeve valve passes over these rings in moving between the open and closed positions of the valve.

Another set of sealing rings 52 encircles the exterior of inner tube 16 in an area closely underlying the trunnion pins 38, 38. Still other sealing rings include a lower set of sealing rings 53 and an upper set 54 spaced to either side of a set of sealing rings 55 installed in the inner wall of the main body tube 15 adjacent the coupling flanges 15a, 15a. All sealing rings will be understood as made of metal or equivalent material capable of withstanding high operating temperatures.

As is clearly shown in FIG. 1, the exterior side of sleeve valve 32 is provided with two sets of sealing rings 53, 54, set 53 being located very substantially below the fluid flow ports 47, 48, 49 and set 54 being located above port 48. Likewise, the fluid seals 45 and 46 are located to either axial side of flow port 47 and are mounted on the outside of inner tube 16 in an area which is never impacted by solid or abrasive material flowing through the valve which always enters the valve inlet 13 and exits through outlet 14. It follows that no one of the important sets of seals 45, 46, 53, 54 ever moves in contact with a valve surface which is subject to impact and erosion by solids and abrasive particles flowing through the cut-off valve.

In order to achieve longer service life without need for disassembly, all internal surfaces of the cut-off valve structure likely to be close to or in contact with the flowing hot fluid and abrasive materials are preferably protected with a protective lining including an inner layer of molded ceramic material 60 and a metal sheath 61 highly resistant to abrasion, corrosion and erosion by flowing high velocity materials. A suitable protective sheath or shroud for the ceramic layer comprises Stellite, stainless steel or other alloys having similar characteristics.

The ceramic and metal components of the protective liner may be molded to shape and installed separately following which the junctions between adjacent edges of the protective shroud may be welded together. For example, the liner components for the interior of the inner tube 16 may comprise separate discs held assembled against the transverse partition 63 of tube 16 by abutment with the inner ends of the cylindrical liner members 60, 61. The latter are held against displacement by being welded at 65 (FIG. 3) along the junction between cylindrical liner 61 and a collar-like metal liner 66 extending crosswise of the radial edges of port 47. Likewise, the ceramic and alloy liner components lining valve port 50 are held in assembled position by a weld 68 bordering the outer rim edge of port 50. These liner components, as are certain others, are accurately constructed to set in similar shaped seating recesses formed in the valve parts supporting the liner elements. No adhesives or other fasteners need be used.

Pressure equalization and neutralizing of the pressure differential across the sleeve valve when closed is accomplished in part by a conduit 70 interconnecting the threaded openings 71 and 72 at the opposite ends of the valve housing and herein indicated by dot and dash line. This conduit preferably is connected in series with conduits 73 which are provided with normally closed valves 80 and 81. These valves are opened to provide a flow of a suitable pressurized purging fluid such as nitrogen to purge the chambers embracing the opposite ends of valve 32 of dust and any other foreign matter after which valves 80 and 81 are closed. In some instance conduits 73 are in communication with pressurized portions of the system to which pipe 11 is connected. Thus, if the system is operating under any pressure, this pressure is communicated by conduits 70 and 73 to the opposite ends of the interior of valve 10. In consequence, both ends of sleeve valve 32 are subjected to the same pressure as the pressure prevailing in the inlet side of pipe 11. The same pressure equalizing action also occurs with both of valves 80 and 81 closed for self-apparent reasons.

Likewise, the annular chamber 74 surrounding the portion of sleeve valve 32 between the sets of sealing rings 54, 55 as well as the annular chamber 75 embracing sleeve valve 32 and port 48 between the two sets of sealing rings 45, 46, are subject to different but nevertheless uniform and equally distributed pressures about the entire inner and outer peripheries of these portions of the sleeve valve.

It follows from the foregoing analysis that the pressures acting on different parts of the sleeve valve are equally distributed and neutralized about each cross-sectional zone from end to end of valve 32. And this is true whether the sleeve valve 32 is open or closed, and there is no unbalanced pressure tending to shift the valve in any radial direction. There are no unbalanced pressures acting against either end of the sleeve valve, or against any wall surface of the valve, and this is true irrespective of whether the sleeve valve 32 is in closed or open position. Accordingly, opening and closing is accomplished very easily simply by reciprocating the operating rod 33 in one direction or the other from the open position shown in FIG. 1 to the closed position in which the upper end of sleeve valve 32 is positioned closely against the interior face of cover plate 20. At that time, the lower transverse edge of flow port 48 will be located above the uppermost one of the set of sealing rings 46.

While the particular valve for fluids containing abrasive particles herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A seatless cut-off valve for controlling flow of fluent material at temperatures of the order of 1,000°F to 17,000°F. and pressures of the order of 1,000 psi, said cut-off valve having a main body formed by long inner and outer concentric tubes forming an annular chamber therebetween movably housing an open-ended sleeve valve, said sleeve valve having a flow port through its sidewall, said sleeve valve and flow port being movable into and out of registry with aligned flow ports in said first and second tubes, inlet passage means in communication with said aligned flow ports and outlet passage means opening into one end of said inner tube, closure means for said inner tube on the end thereof remote from said outlet passage means, closure means for the opposite ends of said annular chamber between said inner and outer tubes, means connected to said sleeve valve for shifting said sleeve valve between the open and closed positions of said flow ports, fluid seal means to either axial side of said flow ports and between said sleeve valve and the juxtaposed surfaces of said inner and outer tubes which seal means are so positioned and arranged as never to move in contact with a surface of said cut-off valve which is ever in the path of fluent material flowing between said inlet and outlet passage means.

2. A cut-off valve as defined in claim 1 characterized in the provision of means interconnecting the opposite ends of said annular chamber supporting said sleeve valve with passage means effective to equalize the pressure acting on the opposite ends and along the portions of said sleeve valve disposed on the remote sides of said fluid seal means.

3. A cut-off valve as defined in claim 1 characterized in that said cutoff valve is so constructed that said sleeve valve is movable between the open and closed positions of said flow ports without making substantially any volumetric change in the interior of said cut-off valve between said inlet and outlet passage means.

4. A cut-off valve as defined in claim 1 characterized in that said outer tube is formed in two sections having means for separably securing the same together between the opposite ends thereof.

5. A cut-off valve as defined in claim 4 characterized in that one end of said inner tube is aligned with and includes seal means forming a fluid tight junction between said one end and said outlet passage means, and removable closure means for the end of said main body remote from said outlet passage means.

6. A cut-off valve as defined in claim 1 characterized in the provision of valve controlled means connected to the opposite ends of said annular chamber housing said sleeve valve for supplying pressurized purging fluid thereto to purge the opposite ends of said annular chamber of dust and foreign matter.

7. A cut-off valve as defined in claim 1 characterized in that said flow ports are inclined to the axis of said sleeve valve.

8. A cut-off valve as defined in claim 1 characterized in that said outer tube is formed in two halves joined by high strength coupling means positioned to one axial side of said aligned flow ports.

9. A cut-off valve as defined in claim 1 characterized in that the flow port in the midlength of said sleeve valve includes at least one rib extending axially transversely of said port with the inner surface thereof flush with the inner surface of said sleeve valve.

10. A pressure-balanced seatless cut-off valve comprising a main body having inner and outer concentric tubes, closure means crosswise of one set of adjacent ends of said tubes and crosswise of said inner tube in an area remote from said one set of ends, outlet passage means from the other end of said inner tube and including means closing the adjacent end of said annular chamber, a sleeve valve open at both ends movably supported in said annular chamber, the midlength portions of said tubes and of said sleeve valve having flow ports which are in or out of alignment depending on the adjusted position of said sleeve valve in said annular chamber, said main body having inlet passage means opposite the flow ports in said inner and outer tubes, fluid seal means permanently disposed to either axial side of said flow ports providing fluid seals between the juxtaposed surfaces of said sleeve valve and said inner and outer tubes, fluid passage means interconnecting the opposite ends of said annular chamber and cooperating with said fluid seals to neutralize the pressure differential between the opposite ends of said annular chamber and along the interior and exterior surfaces of said sleeve valve.

11. A cut-off valve as defined in claim 10 characterized in the provision of high temperature heat resistant liner means for said flow ports and the interior surfaces of said sleeve valve and of said inner tube exposed to contact with the fluid flow being controlled by said cut-off valve.

12. A cut-off valve as defined in claim 11 characterized in that said liner means includes ceramic material.

13. A cut-off valve as defined in claim 11 characterized in that said ceramic material is provided with a protective shroud of abrasion resistant high temperature metal.

14. A cut-off valve as defined in claim 13 characterized in that said shroud comprises a Stellite type alloy metal highly resistant to abrasion and corrosion.

15. A cut-off valve as defined in claim 13 characterized in that said liner means extends along at least the surface of said sleeve valve contactable by the fluid flow in the closed position thereof.

16. A cut-off valve as defined in claim 13 characterized in that said flow ports in the sidewalls of said tubes are inclined acutely to the axis of said tubes and toward said outlet passage means in one end of said cut-off valve.

17. A cut-off valve as defined in claim 10 characterized in that said sleeve valve and said inner and outer tubes comprise cast steel.

18. A cut-off valve as defined in claim 10 characterized in that said inner and outer tubes and said sleeve valve having means so constructed and arranged that said sleeve valve can be opened and closed substantially without change in the interior volume of said cut-off valve between inlet and outlet passage means.

19. A cut-off valve as defined in claim 10 characterized in the provision of means extending from one end of said sleeve valve through the adjacent end of said cutoff valve manipulatable to shift said sleeve valve between the open and closed positions thereof.

* * * * *